United States Patent
Udriste et al.

(10) Patent No.: US 10,000,288 B2
(45) Date of Patent: Jun. 19, 2018

(54) LATERALLY AND RECLINE ADJUSTABLE AIRCRAFT PASSENGER SEAT

(71) Applicant: B/E AEROSPACE, INC., Wellington, FL (US)

(72) Inventors: Daniel Udriste, Coral Springs, FL (US); Javier Valdes De La Garza, Miami, FL (US); Catalin Bunea, Miramar, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 173 days.

(21) Appl. No.: 15/059,847

(22) Filed: Mar. 3, 2016

(65) Prior Publication Data
US 2016/0288910 A1    Oct. 6, 2016

Related U.S. Application Data

(60) Provisional application No. 62/128,584, filed on Mar. 5, 2015.

(51) Int. Cl.
*B64D 13/00* (2006.01)
*B64D 11/06* (2006.01)
*B64D 11/00* (2006.01)

(52) U.S. Cl.
CPC ........ *B64D 11/064* (2014.12); *B64D 11/0015* (2013.01); *B64D 11/0602* (2014.12); *B64D 11/0606* (2014.12)

(58) Field of Classification Search
CPC ............ B64D 11/064; B64D 11/06395; B64D 11/0648; B60N 2/0204; B60N 2/0216; B60N 2/0232; B60N 2002/0236; B60N 2202/024; B60N 2/06; B60N 2/062; B60N 2/07; B60N 2/0735; B60N 2/0737
See application file for complete search history.

(56) References Cited

U.S. PATENT DOCUMENTS

| | | | | |
|---|---|---|---|---|
| 6,000,659 A | * | 12/1999 | Brauer | B64D 11/00 244/118.5 |
| 7,651,167 B2 | * | 1/2010 | Sawdy | B60N 2/062 297/344.1 |
| 9,403,448 B1 | * | 8/2016 | Evans | B60N 2/07 |
| 9,802,514 B2 | * | 10/2017 | Troyer | B60N 2/24 |

(Continued)

FOREIGN PATENT DOCUMENTS

FR    2971746 A1    8/2012

OTHER PUBLICATIONS

International Search Report and Written Opinion dated May 19, 2016 to the corresponding International patent application No. PCT/US2016/024643, 13 pages.

*Primary Examiner* — Philip J Bonzell
(74) *Attorney, Agent, or Firm* — Clements Bernard Walker PLLC

(57) ABSTRACT

A laterally and recline adjustable aircraft passenger seat assembly including a seat, spaced forward and rear rails, a seat recline motion assembly attached to the seat and slidable along the length of the spaced forward and rear rails and including a first actuator dedicated for seat recline motion, and a lateral seat motion assembly disposed between the spaced forward and rear rails and including a second linear actuator dedicated for driving lateral motion of the seat recline motion assembly.

14 Claims, 7 Drawing Sheets

(56) References Cited

U.S. PATENT DOCUMENTS

| | | | |
|---|---|---|---|
| 2006/0108846 A1* | 5/2006 | Sawdy | B60N 2/062 297/344.1 |
| 2013/0113250 A1 | 6/2013 | Udriste | |
| 2015/0008714 A1 | 1/2015 | Erhel | |
| 2016/0264024 A1* | 9/2016 | Michels | B60N 2/14 |
| 2017/0015218 A1* | 1/2017 | Troyer | B60N 2/062 |
| 2017/0088022 A1* | 3/2017 | Troyer | B60N 2/24 |
| 2017/0275003 A1* | 9/2017 | Erhel | B64D 11/0641 |
| 2017/0305306 A1* | 10/2017 | Park | B60N 2/309 |

* cited by examiner

LATERALLY AND RECLINE ADJUSTABLE AIRCRAFT PASSENGER SEAT

CROSS-REFERENCE TO RELATED APPLICATION

This Application claims priority from U.S. Application No. 62/128,584 filed Mar. 5, 2015, the entirety of which is incorporated by reference herein.

TECHNICAL FIELD AND BACKGROUND OF THE INVENTION

The present invention relates generally to a premium class adjustable aircraft passenger seat, and more particularly, to an aircraft passenger seat equipped with a first actuator dedicated for seat recline and a second actuator dedicated for lateral seat motion, wherein the first and second actuators can actuate independently or together to speed the time to adjust sitting and lateral seat positions.

Premium class aircraft passenger seats can be selectively adjustable between an upright sitting position for taxi, take-off and landing (TTOL), and a horizontal sleeping position for maximum comfort during flight. In the fully upright sitting position, the seat back is nearest vertical, the seat bottom is at a shallow angle to horizontal, and the leg rest vertically oriented and stowed against the front of the seat. In the horizontal sleeping or "lie flat position," the seat back, seat bottom and leg rest are oriented substantially horizontal such that the three support surfaces align in a common plane to cooperatively form a continuous horizontal bed. Premium class seats can also include left and right armrests which may adjust vertically to further expand the total surface area of the bed.

Adjustability of the seat back, seat bottom and leg rest can be achieved using one or more actuators. The seat back and seat bottom may be linked such that one single actuator can be used to drive the movement of one seat component, which is turn drives the movement of the other seat component. For example, a single actuator may be used to drive seat bottom movement (i.e., translational and angular movement) which pulls the seat back along therewith along a predetermined path. The leg rest can be moved using a dedicated leg rest actuator such that the leg rest is adjustable regardless of the sitting position of the seat.

In some instances it may be necessary or desirable to provide lateral adjustability to the seat. For example, some seats lack an integrated leg rest and therefore may make use of an ottoman positioned apart from the seat to help form the bed. While the ottoman may be positioned directly forward of the seat, in other seating arrangements it may be desirable to position the ottoman to one side of the seat, requiring that the seat move either left or right to align with the ottoman to help form the bed. In another example, passenger suites may include separate seating and working areas, and in such suites it may be desirable to move the seat left or right between these areas. In still another example, it may simply be desirable to be able to adjust the seat left or right based on passenger preference.

There are currently no powered solutions for lateral seat motion. As such, what is needed is a powered solution to provide lateral seat adjustability.

BRIEF SUMMARY OF THE INVENTION

It is therefore an object of the invention to provide a premium class aircraft passenger seat capable of both seat recline and lateral seat motion.

It is another object of the invention to provide a laterally adjustable aircraft passenger seat wherein the seat can move left and right to align the seat with furniture, move the seat between adjacent sleeping and work/dining areas, accommodate installation flexibility, satisfy customer seat position preference, etc.

It is yet another object of the invention to provide a premium class passenger seat equipped with a first actuator dedicated for seat recline motion and a second actuator dedicated for lateral seat motion.

It is yet another object of the invention to provide a passenger seat equipped with dual actuators, wherein the actuators can be actuated independently or together to speed the time to adjust both sitting position and lateral seat position.

To achieve the foregoing and other objects and advantages, in a first embodiment the present invention provides a laterally and recline adjustable aircraft passenger seat assembly including a seat having a seat bottom and a seat back, spaced forward and rear rails, a seat recline motion assembly attached to the seat and slidable along the spaced forward and rear rails, the seat recline motion assembly dedicated for driving seat recline motion and including a first linear actuator oriented parallel to a longitudinal axis of the seat and interconnected to the seat bottom, and a lateral seat motion assembly disposed between the spaced forward and rear rails, the lateral seat motion assembly dedicated for driving lateral seat motion and including a second linear actuator oriented perpendicular to the first linear actuator and attached to the seat recline motion assembly.

In a further embodiment, the seat recline motion assembly can include spaced left and right primary frame members interconnected through spaced forward and rear secondary frame members, and spaced left and right liner actuator frame members spanning between the forward and rear secondary frame members and cooperatively supporting the first linear actuator therebetween.

In a further embodiment, the second linear actuator can be attached to one of the spaced left and right primary frame members of the seat recline motion assembly such that linear motion of the second linear actuator drives left or right seat motion.

In a further embodiment, the spaced left and right primary spreaders can be attached to respective spaced left and right seat spreaders of the seat.

In a further embodiment, the lateral seat motion assembly can include a fixed spreader spanning between the spaced forward and rear rails, and wherein the second linear actuator is attached to one side of the fixed spreader.

In a further embodiment, the assembly can include spaced forward and rear beams tubes positioned inward of the spaced forward and rear rails, left and right legs attached to ends of the spaced forward and rear beam tubes, and left and right spreaders positioned inward of the left and right legs and attached to the spaced forward and rear beam tubes and the spaced forward and rear rails.

In a further embodiment, the first linear actuator can be arranged to slide over the second linear actuator as the seat recline motion assembly slides along the spaced forward and rear rails.

In a further embodiment, the laterally and recline adjustable aircraft passenger seat assembly can be positioned within a suite in an airliner and can be adapted to move left or right across a width of the suite.

In a further embodiment, the suite can include a video monitor positioned forward of the seat, and the seat can be configured to travel across the width of the suite between a first position in which the video monitor is directly forward of the seat and a second position in which the video monitor is at an angle to the seat.

According to another embodiment, the present invention provides an aircraft passenger seating arrangement including a suite having a video monitor positioned on a forward wall thereof, and a laterally and recline adjustable aircraft passenger seat assembly positioned within the suite, wherein the seat assembly includes a seat facing the video monitor and including a seat bottom and a seat back, spaced forward and rear rails, a seat recline motion assembly attached to the seat and slidable along the spaced forward and rear rails, the seat recline motion assembly dedicated for driving seat recline motion and including a first linear actuator oriented parallel to a longitudinal axis of the seat and interconnected to the seat bottom, and a lateral seat motion assembly disposed between the spaced forward and rear rails, the lateral seat motion assembly dedicated for driving lateral seat motion and including a second linear actuator oriented perpendicular to the first linear actuator and attached to the seat recline motion assembly.

In a further embodiment, the laterally and recline adjustable aircraft passenger seat assembly can be positioned within the suite such that the seat is adapted to travel across a width of the suite.

In a further embodiment, the seat can be configured to travel across the width of the suite between a first position in which the video monitor is directly forward of the seat and a second position in which the video monitor is at an angle to the seat.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
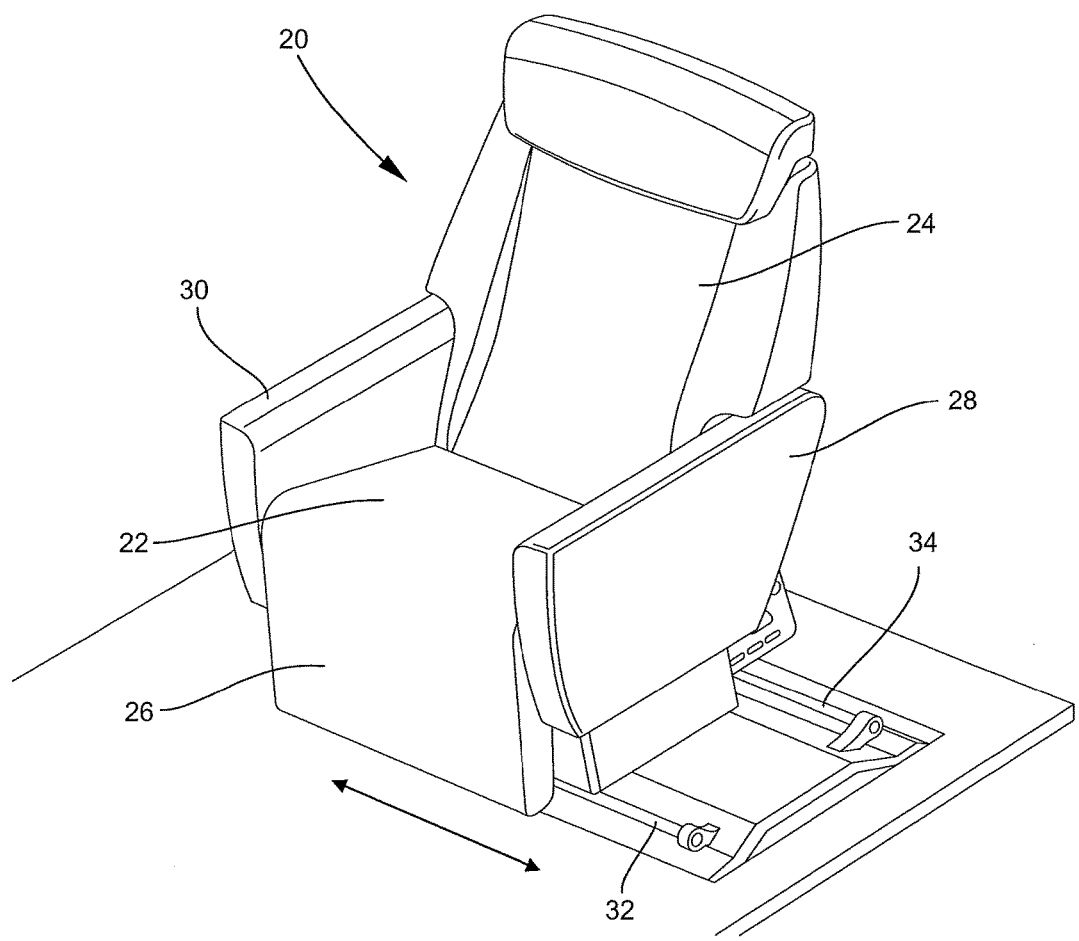
FIG. 1 is a perspective view of a passenger equipped with dual actuators for seat recline and lateral seat motion.
Figure 2:
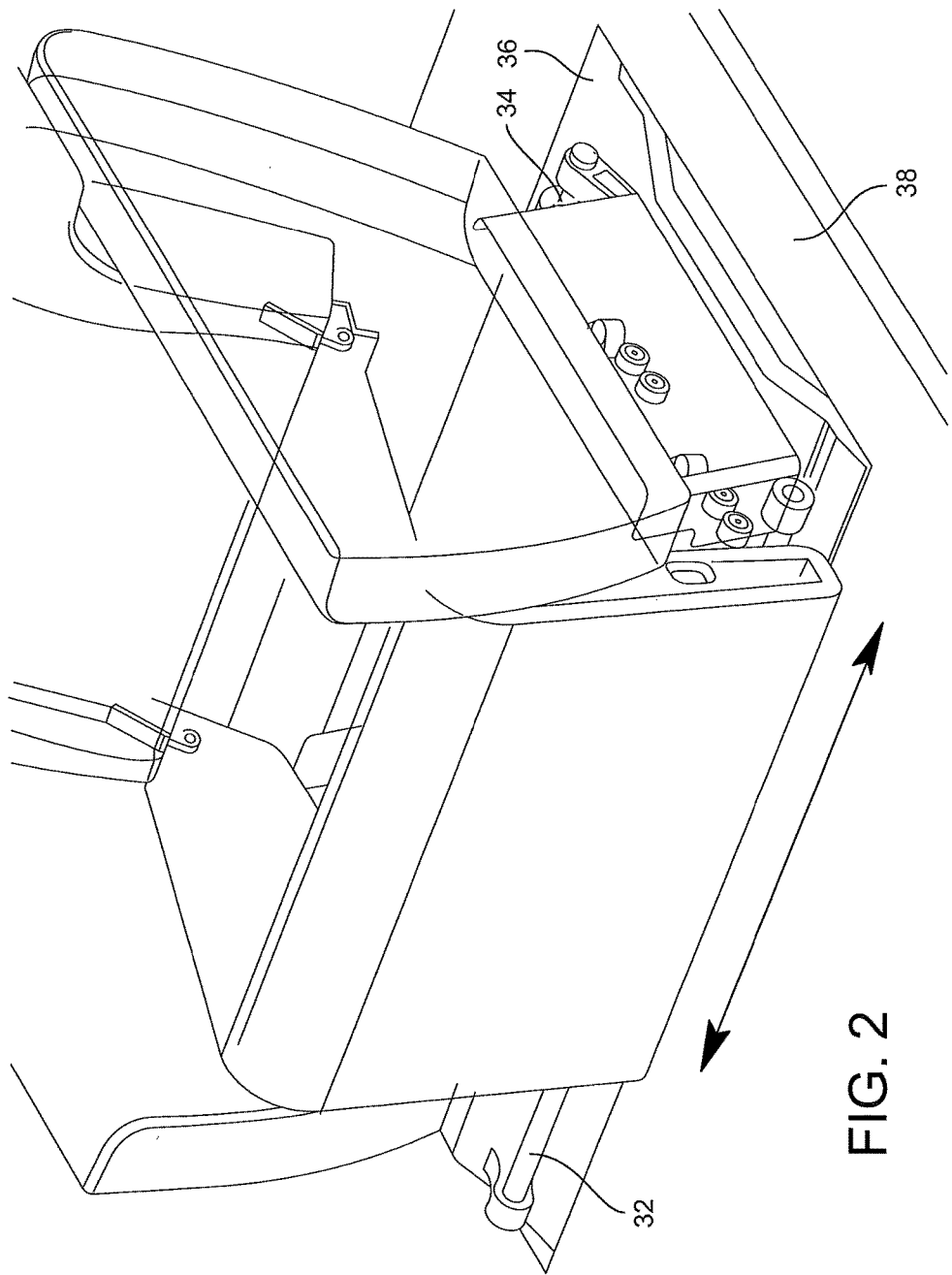
FIG. 2 is a detailed view of the lower portion of the seat of FIG. 1.

FIGS. 1 and 2 show an aircraft passenger seat 20 configured to selectively adjust between an upright sitting position for TTOL and a horizontal sleeping position during flight. In addition to recline adjustability, the seat 20 is equipped with a lateral motion assembly such that the seat can be moved left and right. The seat 20 generally includes a seat bottom 22, a seat back 24, and an optional leg rest 26. The seat components are attached to and supported by underlying frame members, some of which may be linked for driving movement of others. For example, seat bottom motion may drive seat back motion or vice versa, while leg rest motion may be independent of both seat bottom and seat back motion. The seat 20 as shown further includes left and right armrests 28, 30, which may be vertically and/or angularly adjustable for comfort and to expand the surface area of the bed when the seat is horizontal. Each of the seat bottom 22, seat back 24, leg rest 26, and left and right armrests 28, 30 may be padded and upholstered for comfort and aesthetics. The seat 20 may lack a leg rest such that a separate ottoman positioned in the vicinity of the seat can be used to support the legs and expand the surface area of the bed when the seat is aligned with the ottoman, as described in detail below.

The seat 20 is cooperatively supported on and slides along the length of spaced forward and rear horizontal rails 32, 34. In this arrangement, the seat 20 is able to move laterally left and right along the length of the rails. The rails 32, 34 are arranged parallel to one another and the length thereof is determinative of the amount of lateral travel in the left and right directions. The terms "left" and "right" as used herein are relative to the longitudinal axis of the seat 20, which may be oriented parallel or at an angle to the longitudinal axis of the aircraft. For example, the seat 20 may be mounted such that the longitudinal axis thereof is parallel, perpendicular or at any angle relative to the longitudinal axis of the aircraft. Regardless of seat orientation, the seat 20 is able to move a predetermined distance in both directions along the length of the rails 32, 34 for purposes of positioning the seat within, a suite, relative to a laterally adjacent seat, relative to adjacent furniture and monuments, based on passenger preference, etc.

As best shown in FIG. 2, the forward and rear rails 32, 34 are attached to an underlying base 36. The base 36 can be recessed into the floor or deck, or into an underlying pedestal defining the boundaries of the suite, shown generally at reference numeral 38. The base 36 may include a covering shroud shaped to conceal the underlying frame and motion members. As shown, the majority of the motion assemblies are concealed from view beneath the seat 20. FIG. 1 shows the seat 20 in a far right position, while FIG. 2 shows seat 20 in a far left position.

Figure 3:
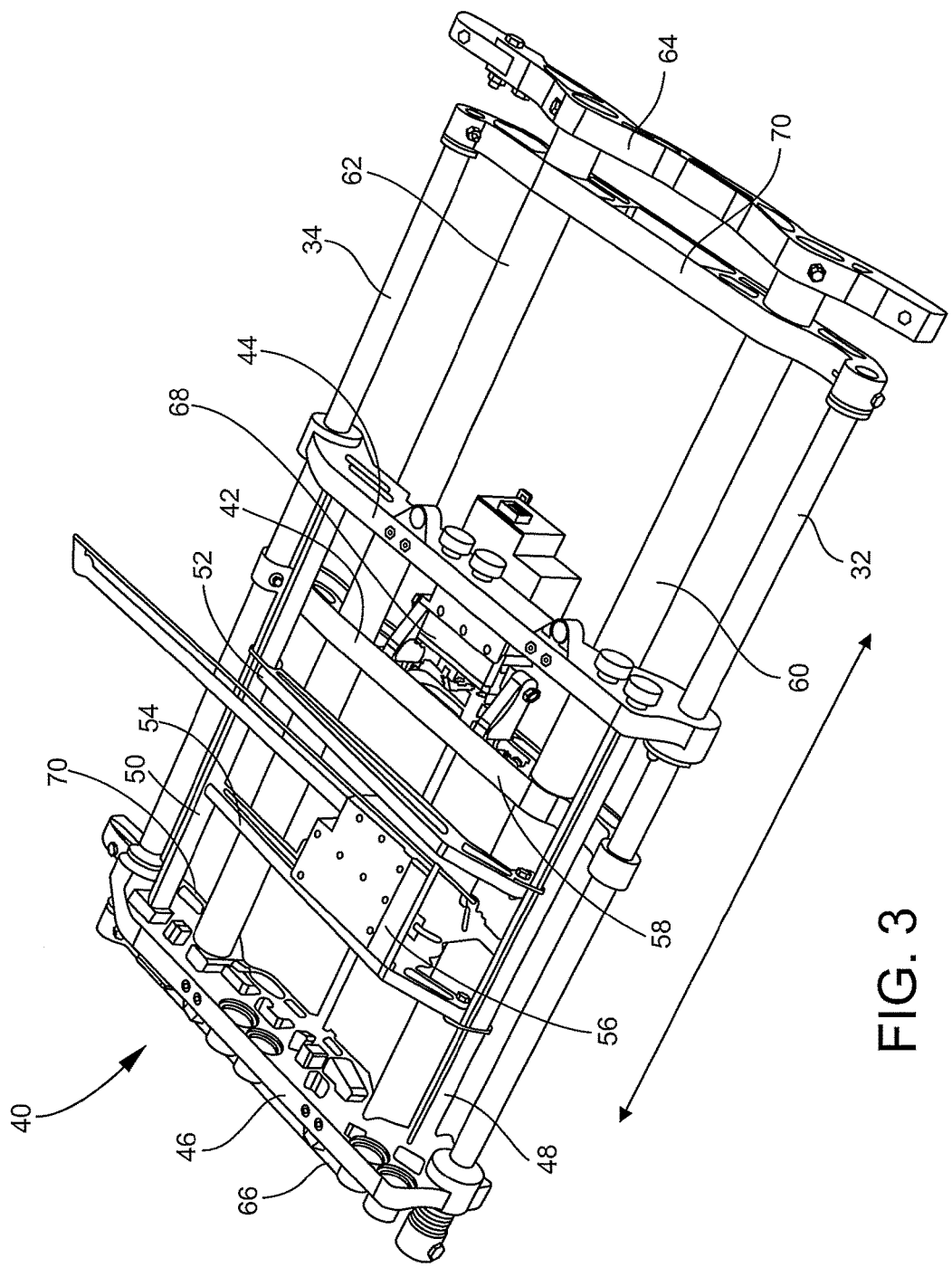
FIG. 3 is a perspective view of the recline and lateral motion assemblies of the seat of FIG. 1.
Figure 4:
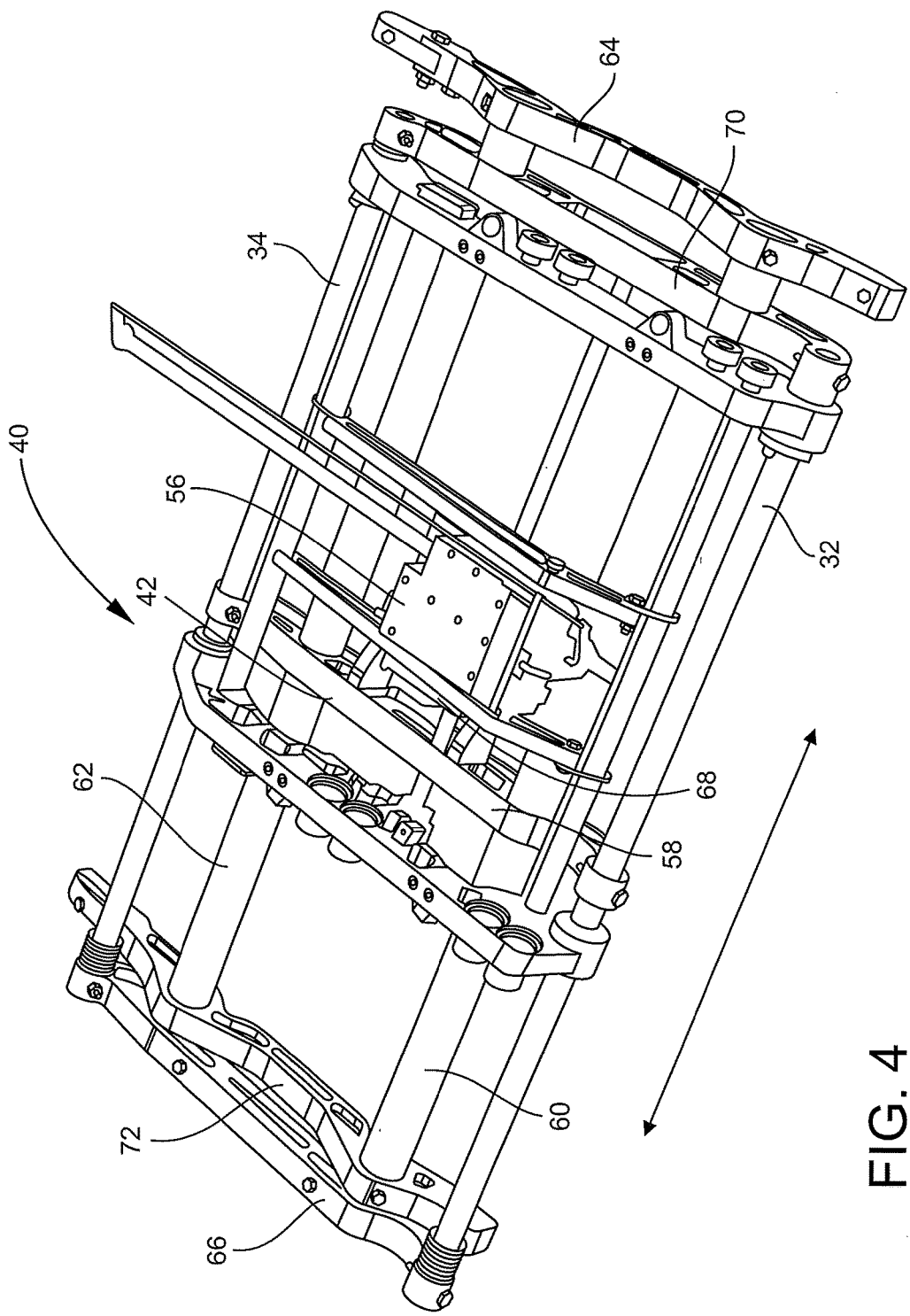
FIG. 4 shows the lateral motion assembly of FIG. 3 in a far left position.

FIGS. 3 and 4 show the primary recline and lateral motion assemblies 40, 42 for moving and/or adjusting the seat 20. The recline motion assembly 40 for adjusting the sitting position of the seat 20 generally includes spaced left and right primary frame members 44, 46 engaging and arranged to slide along the forward and rear rails 32, 34. Each end of the primary frame members 44, 46 defines an opening for receiving one of the rails 32, 34 therethrough. The primary frame members 44, 46 are interconnected through spaced forward and rear secondary frame members 48, 50. Actuator frame members 52, 54 attach to and span the distance between the secondary frame members 48, 50. The actuator frame members 52, 54 cooperatively support a first linear actuator 56 therebetween dedicated for seat recline motion. The entire recline motion assembly 40 is arranged to slide along the horizontal rails 32, 34, and the spacing and parallelness between corresponding frame members within the assembly maintains the overall squareness of the assembly.

The first linear actuator 56 is oriented such that the actuator thereof is parallel to the longitudinal axis of the seat 20. In this arrangement, movement of the linear actuator "forward" or "back" drives seat bottom and/or seat back motion through conventional linkage and any number of conventional linkage arrangements. For example, the forward end of the actuator may be attached through linkage to the forward end of the seat bottom such that movement of the actuator in the forward direction of the seat drives the seat bottom forward, which in turn pulls the pivotally attached bottom end of the seat back forward. The seat back may be guided along a guide having a predetermined curvature that controls the seat back angle as the seat back reclines. The farther the seat bottom is moved forward, the closer to horizontal the seat back becomes until both the seat bottom and seat back are substantially horizontal to form the bed.

The lateral motion assembly 42 responsible for moving the seat left and right is positioned beneath the recline motion assembly 40 and generally includes a middle spreader 58 fixed to and spanning between the forward and rear rails 32, 34. The middle spreader 58 is also fixed to and spans between spaced forward and rear beam tubes 60, 62 positioned inward of the respective forward and rear rails 32, 34. The forward and rear beam tubes 60, 62 ultimately support the recline and lateral motion assemblies 40, 42 in a slightly elevated position above the deck or underlying support pedestal.

The forward and rear beam tubes 60, 62 are received through openings in spaced left and right legs 64, 66 that serve to secure the entire assembly to the floor. The forward and rear beam tubes 60, 62 are also received through openings in spaced left and right spreaders 70, 72 positioned inward of the respective spaced left and right legs 64, 66. The left and right spreaders 70, 72, as well as the middle spreader 58 positioned therebetween, maintain the parallelness of the forward and rear rails 32, 34, and the forward and rear beam tubes 60, 62 positioned inward of the rails. In this arrangement, the forward and rear beam tubes 60, 62 are the primary support members of the entire assembly, the left, right and middle spreaders 70, 72, 58 support the forward and rear rails 32, 34, and the recline motion assembly 40 is able to translate along the forward and rear rails 32, 34.

The second linear actuator 68 dedicated for lateral seat motion is attached to one side of the middle spreader 50 such that the actuator thereof is oriented perpendicular to the actuator of the first linear actuator 56 dedicated for seat recline motion. In this arrangement, the first linear actuator 56 moves/strokes parallel to the longitudinal axis of the seat 20, while the second linear actuator 68 moves/strokes perpendicular to the longitudinal axis of the seat 20. In other words, the second linear actuator 68 strokes left and right between the left and right spreaders 70, 72 carrying the seat recline motion assembly 40 therewith. As best shown in FIG. 3, the far right end of the second actuator 68 is attached to the right-hand primary frame member 46 such that movement of the second actuator to the left pulls the right primary frame member 46 to the left, and movement of the second actuator to the right pushes the right primary frame member 46 to the right, thereby moving the entire recline motion assembly 40 to the left and right.

Comparing FIGS. 3 and 4, the recline motion assembly 40 is positioned above the lateral motion assembly 42 such that the recline motion assembly 40 is able to pass over the top of and clear the lateral motion assembly 42 as the seat 20 moves from the far right position shown in FIG. 3 to the far left position shown in FIG. 4. As further evident in FIGS. 3 and 4, the overall assembly generally includes paired frame members in the left and right and/for forward and rear positions for strength, stability and to prevent flexing and twisting.

Figure 5:
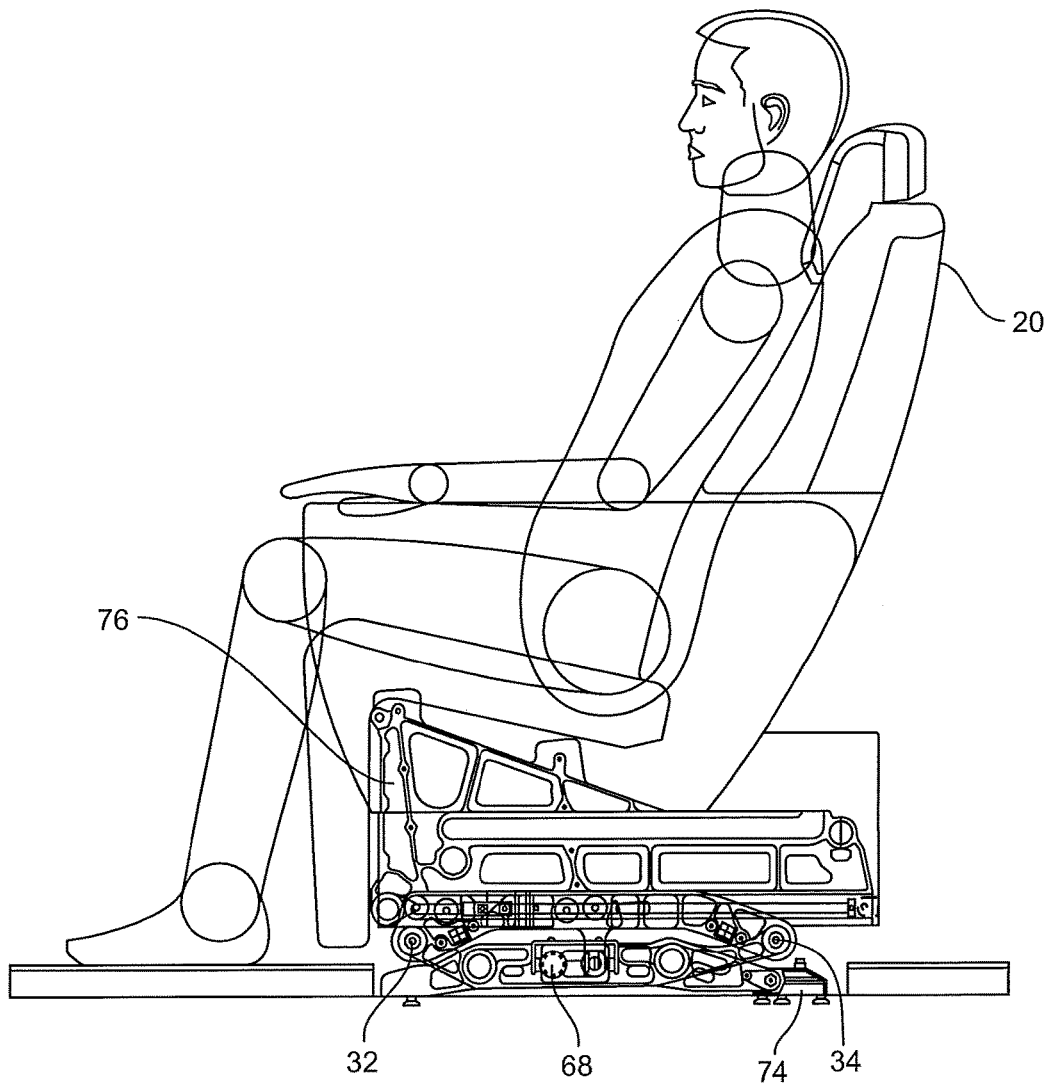
FIG. 5 is a side view of the seat of FIG. 1 shown occupied.

FIG. 5 is a side view of the seat 20 showing attachment of the legs to the floor using conventional track fasteners 74 having studs designed to engage within slots in seat tracks in the floor. The seat recline and lateral motion assemblies are substantially concealed from view beneath the seat 20, and a portion of the seat, such the armrests, may overhang the ends of the horizontal rails 32, 34 in the farthest left and right seat positions to further conceal the rails. This arrangement conceals most of the assemblies under the seat for aesthetics and safety. The rails 32, 34 may have any length depending upon on the amount of needed left and right seat travel, and additional frame members may be used to support long rail lengths. Seat spreaders indicated at reference numeral 76 may serve to attach the seat 20 to the seat recline motion assembly 40. For example, left and right seat spreaders 76 may attach to the respective left and right primary frame members 44, 46 to secure the seat 20 to the seat recline motion assembly 40.

The seat 20, shown in the upright sitting position in FIG. 5, is positioned with the center of gravity thereof generally centered between the forward and rear horizontal rails 32, 34. The seat recline actuator 56 may be arranged to drive forward and aft movement of a seat bottom member, which may in turn drive seat back recline and/or leg rest extension. Each linear actuator may be a mechanical linear actuator, for example, a screw-type actuator, that converts rotary motion into linear motion and allows for infinite adjustability and locking along the full length of the stroke. Actuator control may be provided in a seat control panel located in one of the armrests or in the vicinity of the seat. The actuators may be independently controlled such that the seat can move left or right without adjusting the recline, and vice-versa. The actuators may also work simultaneously to speed the time to bring the seat upright or adjust the seat to the horizontal sleeping position while moving the seat left and right.

Figure 6:
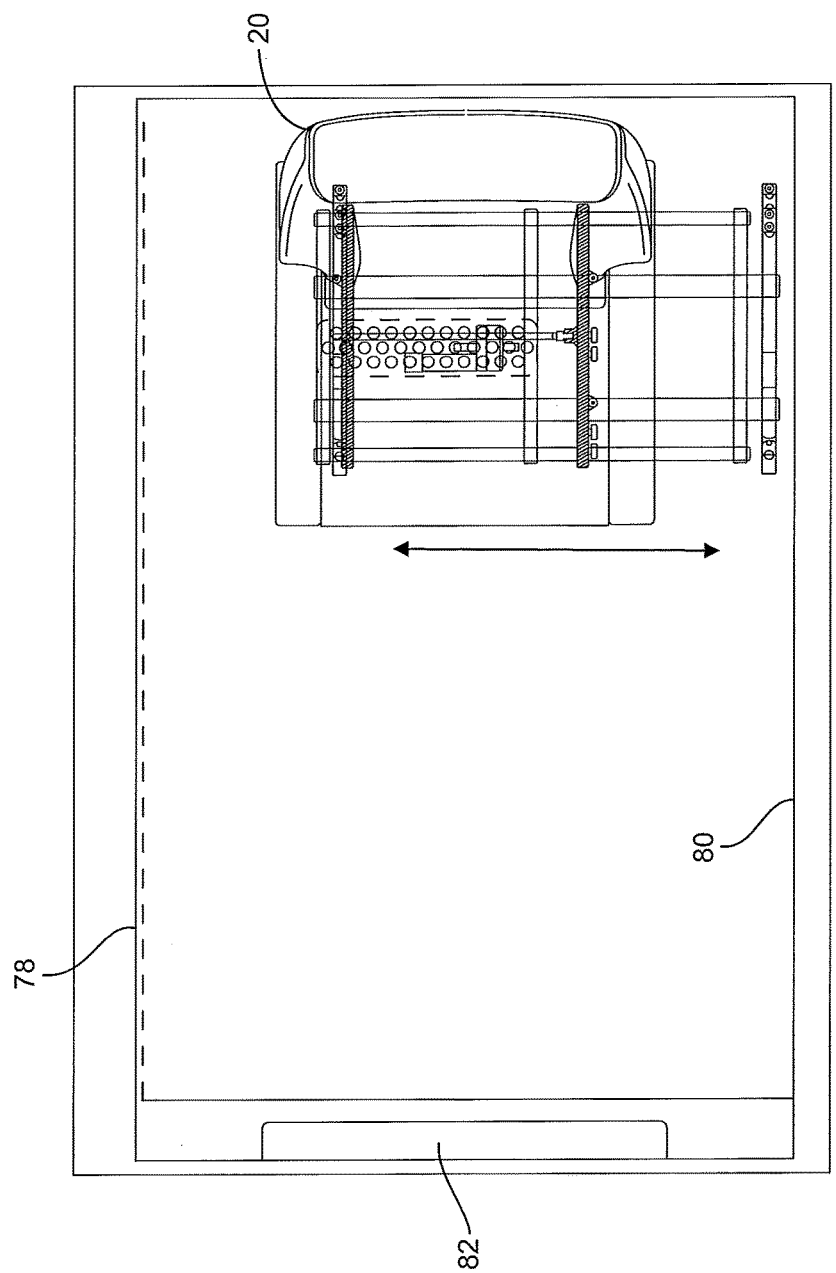
FIG. 6 is a top plan view of a passenger suite including the seat of FIG. 1 shown in a far right position.
Figure 7:
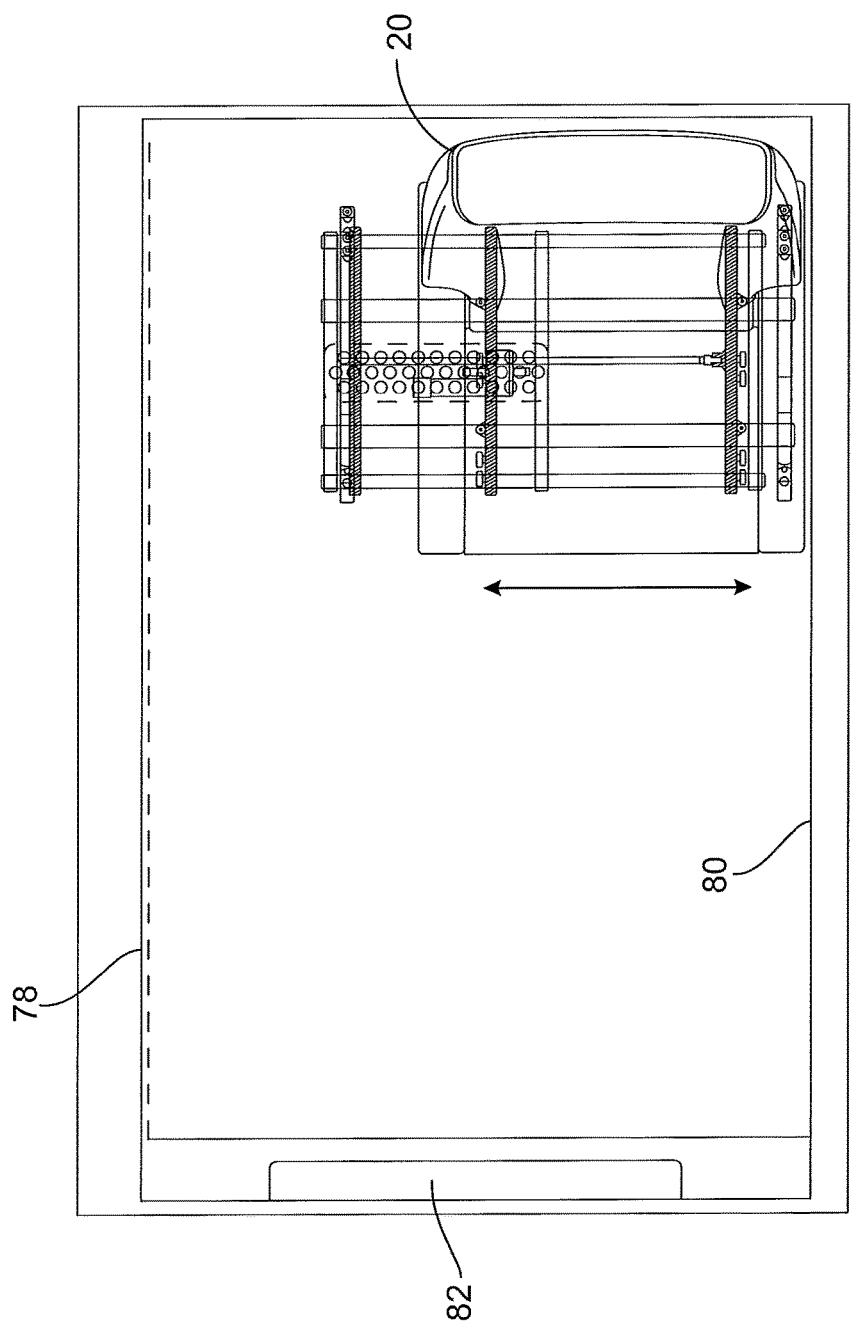
FIG. 7 is a top plan view of the passenger suite of FIG. 8 showing the seat in a far left position.

FIGS. 6 and 7 schematically illustrate a suite, such as a personal passenger suite on board and airliner. The suite 78 is generally defined by partition walls and the seat 20 is positioned within the suite such that the seat can move left and right across the width of the suite. The seat can be moved in response to passenger preference, to move the seat apart from an adjacent wall 80 to accommodate a larger passenger, to move the seat out of the way of obstacles in the vicinity of the seat to permit the seat to recline or achieve a full horizontal sleeping position, to center the seat in front of a video monitor 82, to align the seat with an ottoman (not shown), to move the seat between a designated work/dining area and a designated sleeping area, or for any number of other reasons.

For example, the seat 20 can be positioned to, the far right such that the seat is centered within the suite 78 as shown in FIG. 6 such that the video monitor 82 is directly forward of the seat for optimal viewing. As shown in FIG. 7, the seat 20 can be positioned to the far left such that the seat is nearest a wall mounted desk or table (not shown), or for another purpose. In a further embodiment, the seat 20 may include a third linear actuator dedicated for forward and rear seat movement.

The foregoing description provides embodiments of the invention by way of example only. It is envisioned that other embodiments may perform similar functions and/or achieve similar results. Any and all such equivalent embodiments and examples are within the scope of the present invention.

What is claimed is:

1. A laterally and recline adjustable aircraft passenger seat assembly, comprising:
    a seat including a seat bottom and a seat back;
    spaced forward and rear rails;
    a seat motion assembly comprising spaced primary frame members slidable along the spaced forward and rear rails, spaced secondary frame members interconnecting the spaced primary frame members, and spaced actuator frame members fixed to the spaced secondary frame members;
    a seat recline motion assembly affixed to the seat and nested between the spaced actuator frame members, the seat recline motion assembly dedicated for driving seat recline motion and including a first linear actuator oriented parallel to a longitudinal axis of the seat; and
    a lateral seat motion assembly affixed to an intermediate frame member disposed between the spaced primary frame members, the intermediate frame member fixed to the forward and rear rails, the lateral seat motion assembly dedicated for driving lateral seat motion and including a second linear actuator oriented perpendicular to the first linear actuator;
    wherein the first linear actuator is disposed above the second linear actuator such that the first linear actuator is configured to pass over the second linear actuator as the seat motion assembly travels along the spaced forward and rear rails, and the second linear actuator is disposed beneath the seat regardless of a lateral position of the seat.

2. The aircraft passenger seat assembly of claim 1, wherein the second linear actuator is attached to one of the spaced primary frame members such that linear motion of the second linear actuator drives lateral seat motion.

3. The aircraft passenger seat assembly of claim 1, wherein the spaced primary frame members are attached to respective spaced seat spreaders of the seat.

4. The aircraft passenger seat assembly of claim 1, wherein the second linear actuator is attached to one side of the intermediate frame member.

5. The aircraft passenger seat assembly of claim 1, further comprising:
    spaced forward and rear beams tubes positioned inward of the spaced forward and rear rails;
    left and right legs attached to ends of the spaced forward and rear beam tubes; and
    left and right spreaders positioned inward of the left and right legs and attached to the spaced forward and rear beam tubes and the spaced forward and rear rails.

6. The aircraft passenger seat assembly of claim 1, wherein the laterally and recline adjustable aircraft passenger seat assembly is adapted to be positioned within a suite in an airliner and is adapted to move laterally across a width of the suite.

7. The aircraft passenger seat assembly of claim 6, wherein the suite includes a video monitor positioned forward of the seat, and the seat is configured to travel across the width of the suite between a first position in which the video monitor is directly forward of the seat and a second position in which the video monitor is at an angle to the seat.

8. An aircraft passenger seating arrangement, comprising:
    a suite including a video monitor positioned on a forward wall of the suite; and
    a laterally and recline adjustable aircraft passenger seat assembly positioned within the suite, comprising:
        a seat facing the video monitor and including a seat bottom and a seat back;
        spaced forward and rear rails;
        a seat motion assembly comprising spaced primary frame members slidable along the spaced forward and rear rails, spaced secondary frame members interconnecting the spaced primary frame members, and spaced actuator frame members fixed to the secondary frame members;
        a seat recline motion assembly affixed to the seat and nested between the spaced actuator frame members, the seat recline motion assembly dedicated for driving seat recline motion and including a first linear actuator oriented parallel to a longitudinal axis of the seat; and
        a lateral seat motion assembly affixed to an intermediate frame member disposed between the spaced primary frame members, the intermediate frame member fixed to the forward and rear rails, the lateral seat motion assembly dedicated for driving lateral seat motion and including a second linear actuator oriented perpendicular to the first linear actuator;
        wherein the first linear actuator is disposed above the second linear actuator such that the first linear actuator is configured to pass over the second linear actuator as the seat motion assembly travels along the spaced forward and rear rails, and the second linear actuator is disposed beneath the seat regardless of a lateral position of the seat.

9. The aircraft passenger seating arrangement of claim 8, wherein the second linear actuator is attached to one of the spaced primary frame members such that linear motion of the second linear actuator drives lateral seat motion.

10. The aircraft passenger seating arrangement of claim 8, wherein the spaced primary frame members are attached to respective spaced seat spreaders of the seat.

11. The aircraft passenger seating arrangement of claim 8, wherein the second linear actuator is attached to one side of the intermediate frame member.

12. The aircraft passenger seating arrangement of claim 8, further comprising:
    spaced forward and rear beams tubes positioned inward of the spaced forward and rear rails;
    left and right legs attached to ends of the spaced forward and rear beam tubes; and
    left and right spreaders positioned inward of the left and right legs and attached to the spaced forward and rear beam tubes and the spaced forward and rear rails.

13. The aircraft passenger seating arrangement of claim 8, wherein the laterally and recline adjustable aircraft passenger seat assembly is positioned within the suite such that the seat is adapted to travel across a width of the suite.

14. The aircraft passenger seating arrangement of claim 13, wherein the seat is configured to travel across the width of the suite between a first position in which the video monitor is directly forward of the seat and a second position in which the video monitor is at an angle to the seat.

* * * * *